Figure 1:
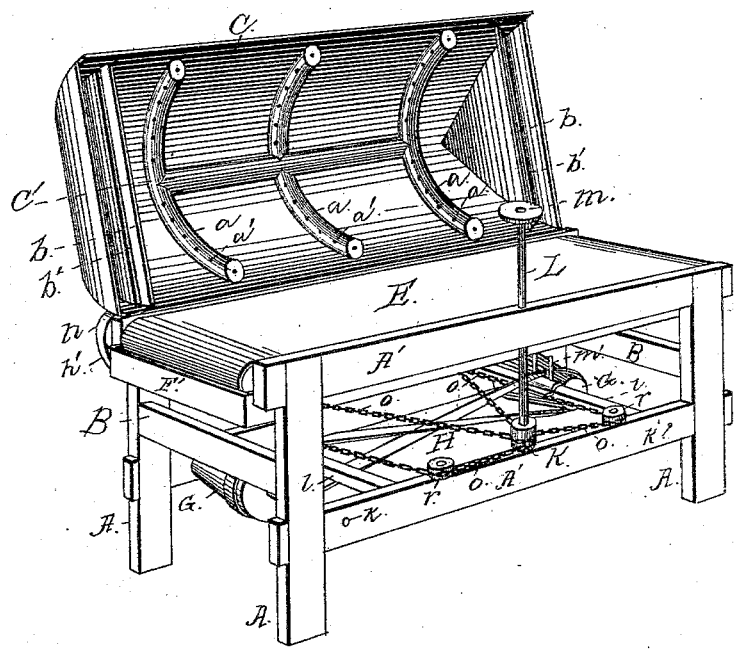

(No Model.) 2 Sheets—Sheet 1.

L. J. OBERLE & J. JANGGEN
MACHINE FOR STEAMING JUMBLES, CRACKERS, &c., BEFORE BAKING.

No. 281,201. Patented July 10, 1883.

Attest,
W. H. Clark.
Jno. E. Schrooden

Inventors,
Louis J. Oberle
John Janggen
Geo. W. Dyer
Att'ys (No Model.) 2 Sheets—Sheet 2.
L. J. OBERLE & J. JANGGEN.
MACHINE FOR STEAMING JUMBLES, CRACKERS, &c., BEFORE BAKING.
No. 281,201. Patented July 10, 1883.
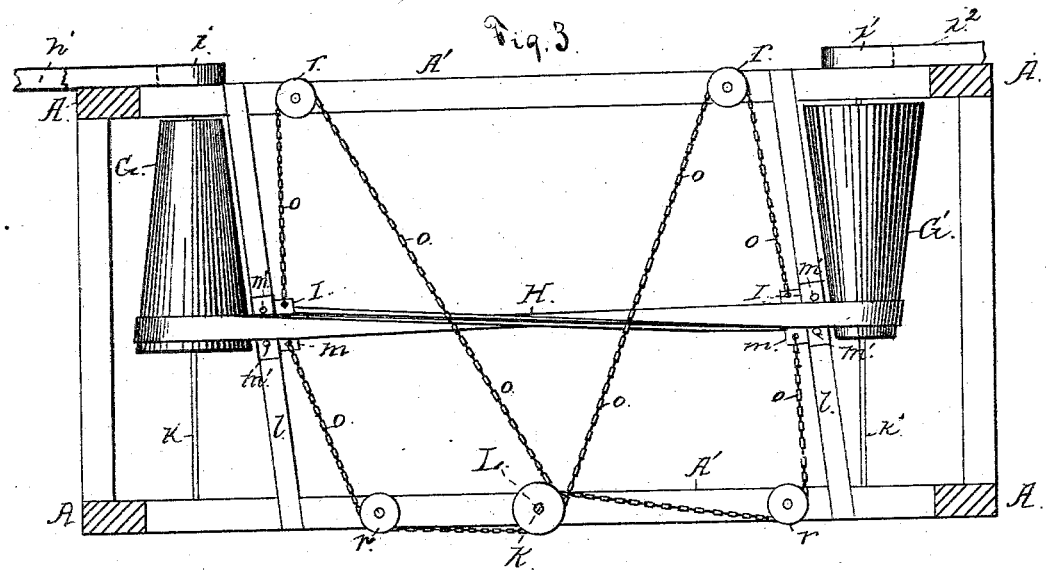
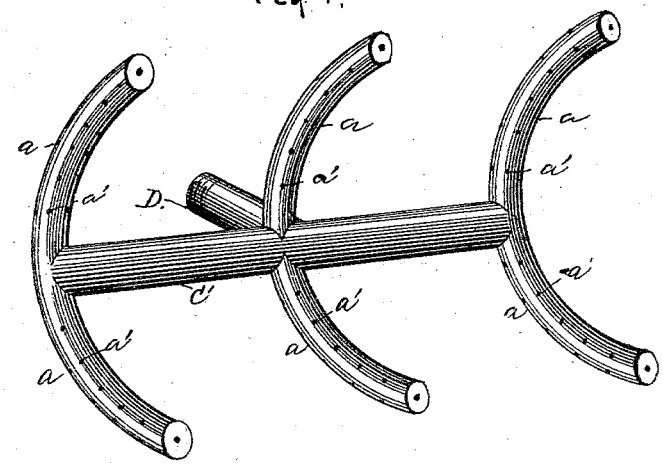
Attest.
N. A. Clark.
Jno. O. Schroeder.
Inventors
Louis J. Oberle
John Janggen
by Geo. W. Dyer
Atty.

UNITED STATES PATENT OFFICE.

LOUIS J. OBERLE AND JOHN JANGGEN, OF DUBUQUE, IOWA, ASSIGNORS OF ONE-THIRD TO JESSE K. FARLEY, OF SAME PLACE.

MACHINE FOR STEAMING JUMBLES, CRACKERS, &c., BEFORE BAKING.

SPECIFICATION forming part of Letters Patent No. 281,201, dated July 10, 1883

Application filed April 20, 1883. (No model.)

*To all whom it may concern:*

Be it known that we, LOUIS J. OBERLE, of Dubuque, in the county of Dubuque and State of Iowa, and JOHN JANGGEN, of Dubuque, in the county of Dubuque and State of Iowa, have invented a new and useful Machine for Steaming Jumbles, Crackers, &c., before they are baked; and we do hereby declare that the following is a full and exact description of the same, reference being had to the accompanying drawings, and to the letters of reference marked thereon.

This invention relates to a machine for steaming the dough from which are made crackers, jumbles, and other similar articles of food manufactured in bakeries.

Heretofore the method of steaming this class of goods, if steamed at all, was by putting the dough upon trays, and then placing the trays on a series of shelves arranged one above the other and secured in a movable frame, which, when thus filled, was introduced into a steam-chamber and there allowed to remain the length of time necessary to thoroughly steam the dough. This method is a slow and an expensive one, in that it necessitates a great amount of labor with an increased delay in transferring the dough from the cutting-machine to the steam-chamber.

It is the object, therefore, of the present invention to dispense with this crude method and its disadvantages by constructing a machine which will rapidly and thoroughly steam the dough in its passage from the cutting-machine to the oven, and thereby produce an article of superior quality, with a great economy in the use of lard, butter, sugar, and other saccharine ingredients.

The invention consists in the use of a suitable frame-work, whereon are provided a bottomless semi-cylindrical cover or casing containing steam-distributing pipes, an endless apron moving under said cover or casing, a perforated condensing-plate, and a dripping-pan for the condensed steam.

It further consists in the mechanism employed for imparting motion to the endless apron and for regulating its speed, all as more fully hereinafter described, and pointed out in the claims.

For the better understanding of our invention, and to acquaint those skilled in its relative art with the construction, arrangement, and operation of the various parts thereof, reference will be made throughout the following description to the accompanying drawings, in which—

Figure 2:
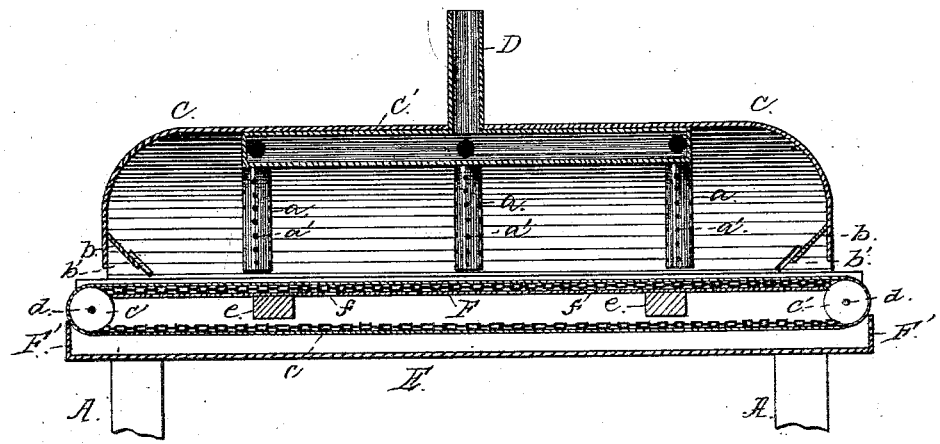

Figure 1 is an elevation in perspective of a machine constructed in accordance with our invention, and with the semi-cylindrical cover or casing raised to expose its interior construction; Fig. 2, a vertical longitudinal section of the upper portion of the machine; Fig. 3, a plan view of the machine, with the cover or casing, endless apron, condensing-plate, and dripping-pan removed to show the construction and arrangement of the mechanism for operating the said apron; and Fig. 4, a view in detail of the steam-distributing pipes.

Like letters of reference indicate corresponding parts in all the figures.

The frame-work of the machine is preferably rectangular in form, and consists of four uprights, A, which are connected longitudinally by beams A', and transversely at each end by a beam, B. The height of this frame-work is to be determined by that of the cutting-machine, at the discharge end of which the machine is to be placed to receive upon an endless apron the dough that is rolled and shaped by the cutting-machine. Upon the top of the frame-work referred to is hinged or permanently secured a cover or casing, C, which is preferably of semi-cylindrical shape and bottomless. On the interior of this cover or casing, and to its ceiling, is secured a pipe, C', having communication at its center with a vertical pipe, D, which passes through the top of the cover or casing C, and connects the said pipe C' with any convenient and suitable source of steam-supply. The pipe C' has several branch pipes, $a\,a\,a$, extending outward at a right angle thereto and bent to conform with the contour of the cover or casing C. Each branch pipe $a$ is provided with numerous perforations, $a'$, which give outlet to the steam in every possible direction and cause a thorough distribution of the same within the cover or casing.

To prevent the too rapid escape of the steam through the ends of the cover or casing, (which have each a space of sufficient width for the entrance and discharge of the dough,) each end is accordingly provided with a plate, $b$, which is secured in the sides of said cover or casing on a slight angle of inclination. The lower edge of each of these plates is provided with a strip of rubber or other suitable elastic material, $b'$, whose lower edge extends down to within a short distance of an endless apron, E. This apron E is made of any suitable textile material of equal width to the space between the side beams, $A'$, and is attached at each edge to a belt or chain, $c$, passing around pulleys $c'$, which are rigidly mounted upon a shaft, $d$, located at each end of the frame-work and journaled in the ends of the upper side beams $A'$. In the space left between the two folds of the endless apron by the intercession of the pulleys $c'$ is inserted a rectangular plate, F, resting upon cross-beams $e\ e$, and having many perforations, $f$, through which the steam condensing on said plate is precipitated into a dripping-pan, $F'$, which is suspended above the lower fold of the endless apron, and preferably removably attached to the upper side beams $A'$. Upon the outer end of one of the shafts carrying the pulleys $c'$ is rigidly mounted a pulley, $h$, connecting by a belt, $h'$, with a pulley, $i$, likewise mounted upon the end of a shaft, $k$, which is journaled in the lower side beams $A'$, and carries a large cone-shaped pulley, G. This pulley G connects by means of an endless belt, H, with a correspondingly-shaped pulley, $G'$, rigidly mounted upon a shaft, $k'$, journaled in the lower side beams $A'$ at the opposite end of the frame-work. The larger end of this pulley $G'$ holds a reversed position to that of its duplicate pulley G, as clearly illustrated in Fig. 3, and for a purpose hereinafter readily understood. Upon the outer end of the shaft $k'$, which carries this pulley $G'$, is mounted a driving-pulley, $i'$, connecting by means of a belt, $i^2$, with any convenient and suitable driving-power.

Running parallel with and close to the periphery of each of the cone-shaped pulleys is a beam, $l$, having its ends resting upon and secured in the lower side beams $A'$. The said beams $l\ l$ are each provided with a movable guide, I, consisting of a strip of metal bent around each beam in the form of a loop, having on one side an extension-plate, $m$, and upon its top two vertical pins, $m'\ m'$, between which passes the endless belt H, that encircles and connects the two cone-shaped pulleys G $G'$. To the extension-plate of each guide thus constructed are attached, at points opposite each other, the free ends of a wire rope or chain, $o$, which extends therefrom in opposite directions, and passes around a pulley, $r$, which is mounted in a horizontal plane upon the top of each of the lower side beams $A'$ at points diametrically opposite when taken on a line parallel with that of the beams carrying the guides I. From these pulleys $r\ r$ the said ropes or chains $o\ o$ pass around a drum, K, secured to a rod, L, which has vertical bearings on one side of the machine in the lower and upper side beams $A'$. This rod L is provided on its upper end with any suitable hand-wheel, M, for operating the same.

As a mere preference, we have described the ropes or chains $o\ o$ as having their free ends first attached to the guides and then passed around the pulleys and drum; but it will be understood that each rope or chain is first wound around the drum, and its free ends then passed around the pulleys and attached to the extension-plate of their respective guide.

By means of the rod L and its connections with the guides I I it will be manifest that when said rod is manipulated the endless belt H can be shifted over the cam-shaped pulleys G $G'$ from end to end, and the speed of the endless apron carrying the dough thereby regulated accordingly as desired. This means for controlling the speed of the apron is very essential, as the dough is required to be thoroughly steamed, and in case of an insufficiency in the supply of steam, or the article to be baked is very thick, the dough must be retarded in its progress under the steam-distributing pipes in order that it may be exposed to the action of the steam the required length of time. The shifting of the endless belt to regulate the speed of the apron is accomplished without cutting off the driving-power.

It will be apparent that instead of attaching the endless apron to belts or chains passing around pulleys, as herein related, the said belts or chains and pulleys could be dispensed with and a long roller substituted at each end of the frame-work.

It will further be apparent that various modifications could be made in the mechanism for operating and regulating the speed of the endless apron without departing from the principle of our invention.

Having thus described our invention, what we claim, and desire to secure by Letters Patent, is—

1. A machine of the character described, wherein are combined a steam-chamber, a movable endless apron, a perforated steam-condensing plate, and a dripping-pan, substantially as set forth.

2. A machine of the character described, having a steam-chamber consisting of a bottomless semi-cylindrical cover or casing, provided on its interior with steam-distributing pipes and at each end with means for preventing the rapid escape of steam, substantially as set forth.

3. In a machine of the character described, the combination, with the steam-chamber consisting of a bottomless semi-cylindrical cover or casing, provided with steam-distributing pipes, of an endless apron moving under said steam-chamber, and a perforated steam-condensing plate and dripping-pan located beneath said endless apron, substantially as described and shown.

4. In a machine of the character described, the combination, with the endless apron, of means for operating and regulating the speed of the same, consisting of two cone-shaped pulleys connected by an endless belt, which passes through guides adapted to shift said belt over said pulleys, from end to end, by means of ropes or chains connecting said guides with a drum upon a hand-operated rod, the several parts being constructed, arranged, and operated substantially as described and shown.

In testimony whereof we affix our signatures in presence of two witnesses.

LOUIS J. OBERLE.
JOHN JANGGEN.

Witnesses:
WILLIAM GRAHAM,
MONROE M. CADY.